(12) United States Patent
Dekock et al.

(10) Patent No.: US 9,372,507 B2
(45) Date of Patent: Jun. 21, 2016

(54) ADJUSTABLE SUPPORT AND A MOBILE COMPUTING DEVICE HAVING AN ADJUSTABLE SUPPORT

(71) Applicant: Intel Corporation, Santa Clara, CA (US)

(72) Inventors: Ben Dekock, Seabeck, WA (US); Shawn McEuen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/040,638

(22) Filed: Sep. 28, 2013

(65) Prior Publication Data
US 2015/0092346 A1    Apr. 2, 2015

(51) Int. Cl.
*G06F 1/16* (2006.01)
(52) U.S. Cl.
CPC ............. *G06F 1/1626* (2013.01); *G06F 1/166* (2013.01); *A45F 2200/0525* (2013.01); *G06F 2200/1633* (2013.01)
(58) Field of Classification Search
CPC ............... A45F 2200/0516; A45F 2200/0525; G06F 2200/1633; G06F 1/1679
USPC ..................... 224/218; 206/45.2; 361/679.59
See application file for complete search history.

(56) References Cited

U.S. PATENT DOCUMENTS

| | | | |
|---|---|---|---|
| 3,785,605 A * | 1/1974 | Parekh ........................... | 248/455 |
| 4,259,568 A * | 3/1981 | Dynesen ........................ | 235/1 D |
| 6,352,186 B1 * | 3/2002 | Endo .............................. | 224/254 |
| 6,366,440 B1 * | 4/2002 | Kung ...................... | E05C 19/16 |
| | | | 361/147 |
| 6,903,927 B2 * | 6/2005 | Anlauff ..................... | 361/679.28 |
| 6,971,622 B2 * | 12/2005 | Ziegler et al. .................. | 248/454 |
| 7,469,809 B2 * | 12/2008 | Rodarte et al. ................. | 224/578 |
| 7,708,141 B1 * | 5/2010 | Huang ........................... | 206/425 |
| 7,780,047 B2 * | 8/2010 | Chen et al. ..................... | 224/218 |
| 8,254,093 B2 * | 8/2012 | Wu ......................... | G06F 1/1615 |
| | | | 312/323 |
| 8,264,310 B2 * | 9/2012 | Lauder et al. .................. | 335/219 |
| 8,300,389 B2 * | 10/2012 | Kang .................. | H04M 1/0254 |
| | | | 361/679.01 |
| 8,310,819 B2 * | 11/2012 | Shen ..................... | G06F 1/1616 |
| | | | 361/679.01 |
| D672,783 S * | 12/2012 | Robinson ..................... | D14/447 |
| 8,358,513 B2 * | 1/2013 | Kim ...................... | G06F 1/1626 |
| | | | 361/807 |
| 8,374,657 B2 * | 2/2013 | Interdonato ................ | 455/575.4 |
| D677,265 S * | 3/2013 | Lu et al. ........................ | D14/451 |
| 8,428,664 B1 * | 4/2013 | Wyers ........................ | 455/575.1 |
| 8,498,100 B1 * | 7/2013 | Whitt, III .............. | G06F 1/1618 |
| | | | 361/679.17 |
| 8,540,205 B2 * | 9/2013 | Zhang et al. ................... | 248/688 |
| 8,550,317 B2 * | 10/2013 | Hyseni .......................... | 224/197 |
| 8,561,862 B2 * | 10/2013 | Foggiato ....................... | 224/217 |
| 8,567,832 B2 * | 10/2013 | Kannaka ........................ | 294/25 |
| 8,622,447 B1 * | 1/2014 | Wirtz .............................. | 294/25 |
| 8,648,821 B2 * | 2/2014 | Wu et al. ....................... | 345/173 |
| 8,649,166 B2 * | 2/2014 | Wu et al. .................. | 361/679.27 |
| 8,693,192 B2 * | 4/2014 | Hsieh et al. .............. | 361/679.59 |
| 8,885,338 B1 * | 11/2014 | Simpson et al. ......... | 361/679.59 |
| 8,902,575 B2 * | 12/2014 | Zhou et al. ................. | 361/679.3 |
| 8,950,638 B2 * | 2/2015 | Wangercyn et al. .......... | 224/217 |

(Continued)

*Primary Examiner* — Adrian S Wilson
(74) *Attorney, Agent, or Firm* — Jordan IP Law, LLC (57) ABSTRACT

A support that is selectively adjustable to a plurality of configurations that enable a variety of viewing/user orientations of a mobile device. The mobile device includes a display, a back panel, a support positioned at the back panel, and adjustment members pivotally connected to respective outer ends of the support and mounted at the back panel to facilitate linear, reciprocating movement along an axis so as to change the relative orientation of the support relative to the back panel.

13 Claims, 8 Drawing Sheets

(56) References Cited

U.S. PATENT DOCUMENTS

| | | | |
|---|---|---|---|
| 8,964,382 B2 * | 2/2015 | Ashcraft et al. | 361/679.59 |
| D723,536 S * | 3/2015 | Werth | D14/253 |
| 8,973,795 B2 * | 3/2015 | Chiu et al. | 224/218 |
| 8,985,543 B2 * | 3/2015 | Chen et al. | 248/460 |
| 9,027,808 B2 * | 5/2015 | Kim | 224/218 |
| 2002/0017545 A1 * | 2/2002 | Badillo et al. | 224/675 |
| 2004/0114315 A1 * | 6/2004 | Anlauff | 361/681 |
| 2004/0190239 A1 * | 9/2004 | Weng | G06F 1/1616 361/679.2 |
| 2005/0205623 A1 * | 9/2005 | Buntain | 224/217 |
| 2005/0264988 A1 * | 12/2005 | Nicolosi | 361/683 |
| 2006/0145046 A1 * | 7/2006 | Liou et al. | 248/455 |
| 2006/0285283 A1 * | 12/2006 | Simonian | A45C 3/02 361/679.55 |
| 2007/0121303 A1 * | 5/2007 | Wang et al. | 361/752 |
| 2007/0133156 A1 * | 6/2007 | Ligtenberg et al. | 361/681 |
| 2008/0156836 A1 * | 7/2008 | Wadsworth et al. | 224/269 |
| 2009/0020570 A1 * | 1/2009 | Chan | 224/222 |
| 2009/0147471 A1 * | 6/2009 | Francisco | G06F 1/1624 361/679.56 |
| 2009/0170574 A1 * | 7/2009 | Harmon | H04M 1/0237 455/575.4 |
| 2010/0194503 A1 * | 8/2010 | Eromaki | H04M 1/0237 335/219 |
| 2010/0232102 A1 * | 9/2010 | Walker et al. | 361/679.27 |
| 2011/0051331 A1 * | 3/2011 | Shi | G06F 1/1679 361/679.01 |
| 2011/0266316 A1 * | 11/2011 | Ghalib et al. | 224/217 |
| 2011/0297566 A1 * | 12/2011 | Gallagher et al. | 206/320 |
| 2011/0309117 A1 * | 12/2011 | Roberts | 224/217 |
| 2012/0008269 A1 * | 1/2012 | Gengler | 361/679.09 |
| 2012/0031937 A1 * | 2/2012 | Baker | 224/217 |
| 2012/0043234 A1 * | 2/2012 | Westrup | 206/320 |
| 2012/0063066 A1 * | 3/2012 | Floit | 361/679.01 |
| 2012/0104059 A1 * | 5/2012 | Yen | 224/218 |
| 2012/0106054 A1 * | 5/2012 | Royz et al. | 361/679.3 |
| 2012/0145876 A1 * | 6/2012 | Zhou et al. | 248/668 |
| 2012/0170212 A1 * | 7/2012 | Gallouzi et al. | 361/679.56 |
| 2012/0175396 A1 * | 7/2012 | Patino | 224/627 |
| 2012/0181196 A1 * | 7/2012 | Mongan et al. | 206/320 |
| 2012/0188693 A1 * | 7/2012 | Chiang et al. | 361/679.01 |
| 2012/0194448 A1 * | 8/2012 | Rothkopf | 345/173 |
| 2012/0199501 A1 * | 8/2012 | Le Gette et al. | 206/45.24 |
| 2012/0217174 A1 * | 8/2012 | Ting | 206/45.2 |
| 2012/0218699 A1 * | 8/2012 | Leung et al. | 361/679.08 |
| 2012/0267402 A1 * | 10/2012 | Beatty | 224/218 |
| 2012/0325689 A1 * | 12/2012 | Wibby et al. | 206/45.2 |
| 2013/0114198 A1 * | 5/2013 | Gengler | 361/679.08 |
| 2014/0083883 A1 * | 3/2014 | Elias | 206/320 |
| 2014/0167431 A1 * | 6/2014 | Enkerlin et al. | 294/142 |
| 2014/0262853 A1 * | 9/2014 | DeChant | 206/45.2 |

\* cited by examiner

ADJUSTABLE SUPPORT AND A MOBILE COMPUTING DEVICE HAVING AN ADJUSTABLE SUPPORT

TECHNICAL FIELD

Embodiments generally relate to a support and a mobile device. More particularly, embodiments relate to a support that is selectively adjustable to a plurality of configurations that enable a variety of viewing/user orientations of a mobile device.

BACKGROUND

There is a growing use of mobile computing devices such as notebook computers and tablet computers. Such devices come in various designs, such as a notebook computer, smart phone, mobile Internet device (MID), smart tablet, convertible tablet, or other similar device. Each device permits a user to enter text, data, indicia, etc. for display on a display, and for touch screen displays, whereby such text, data, indicia, etc. is entered via one or more fingers, or a mechanical device such as a stylus.

Current designs are removing componentry from the base, making it lighter, and placing the componentry into the display, thus making the display heavier. Such inversion of componentry has resulted in numerous problems, including, for example, devices tipping over during opening, touchscreens tipping over during touch interactions due to the applied force of the finger(s) and/or stylus, and complications during detachment and reattachment of detachable tablets to their bases.

Some solutions provide for the addition of a kickstand to provide stability during touch interactions. The use of such a kickstand is not fully ergonomically advantageous to the user since it lacks adjustability, i.e., the kickstand when deployed only permits a single viewing/user orientation.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
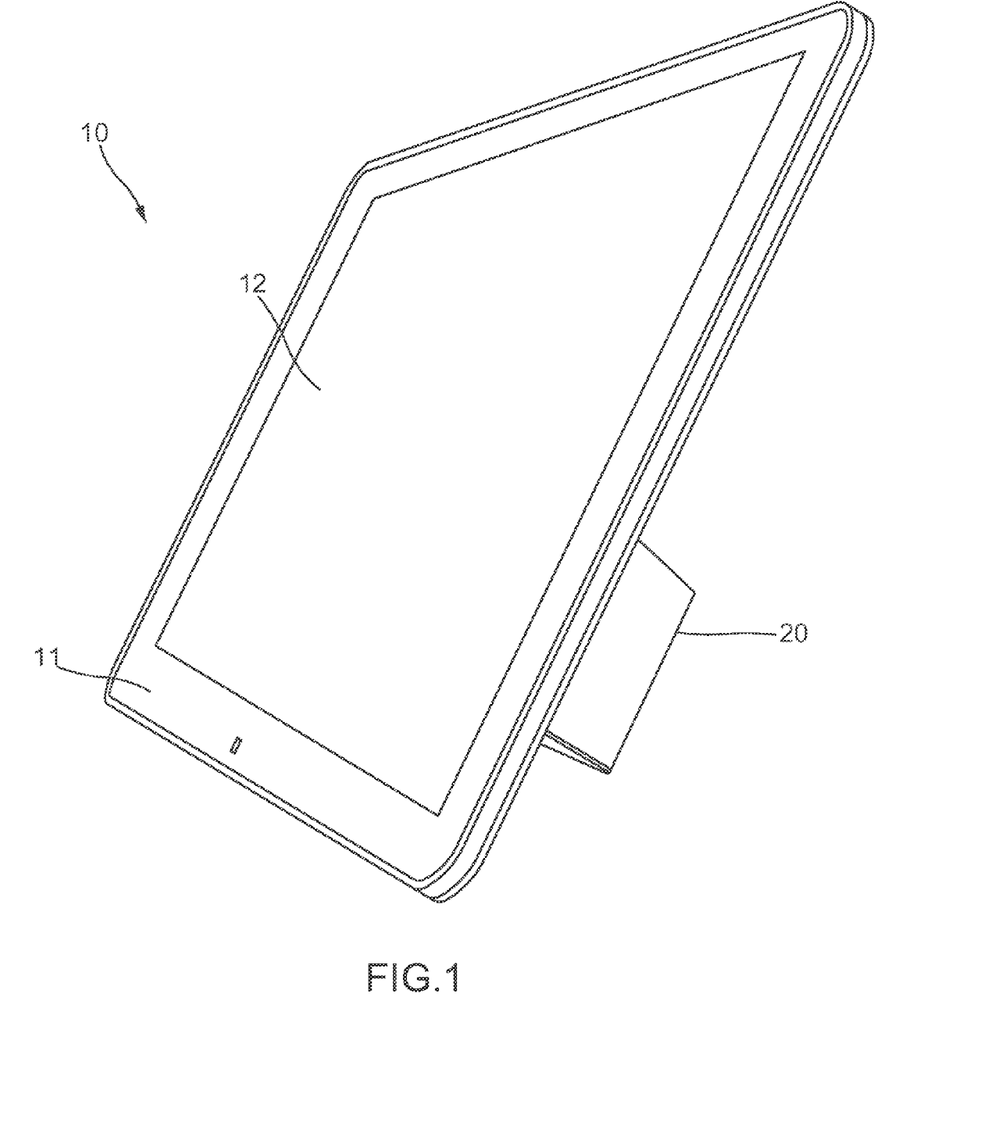
FIG. 1 is a perspective view of an example of a mobile computing device with an adjustable support and which is oriented in landscape mode, in accordance with embodiments.
Figure 2:
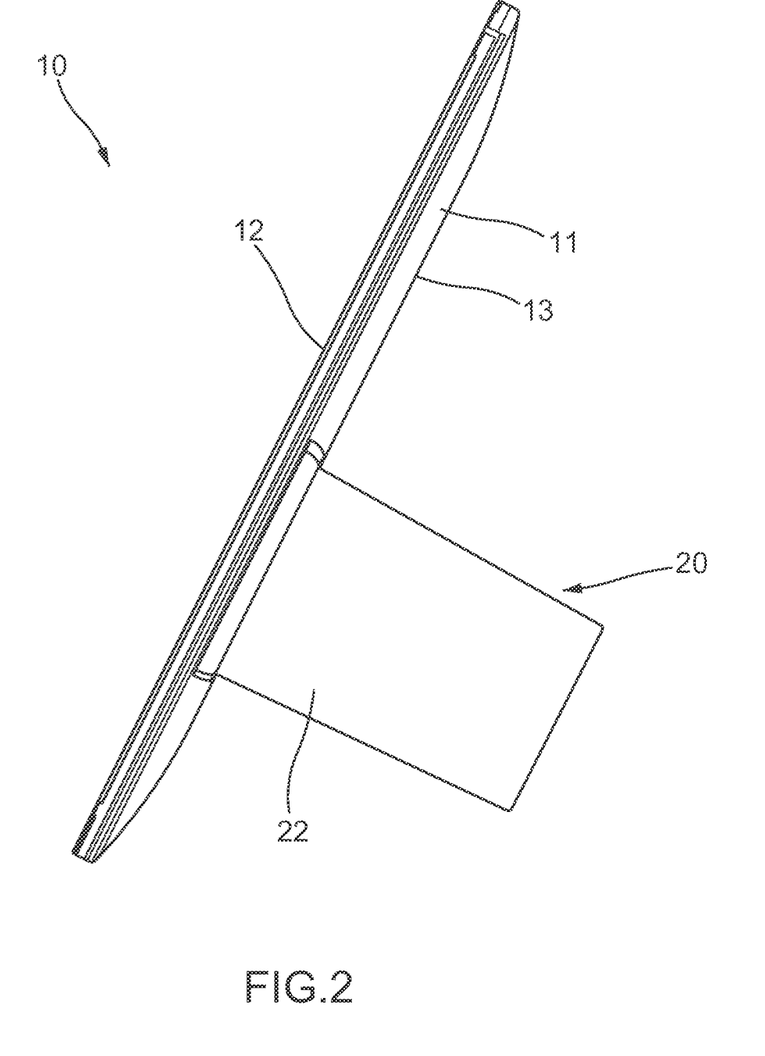
FIG. 2 is a side view of an example of a mobile computing device with an adjustable support and which is oriented in landscape mode, in accordance with embodiments.

As illustrated in FIGS. 1 and 2, a portable computing device, such as, for example, a mobile device 10, may be supported in a variety of orientations on a support surface in a stable manner by a support 20. The support 20 is detachably mounted at a back plate 13 of the mobile device 10 and is selectively adjustable to a plurality of configurations that enable the variety of viewing/user orientations of the mobile device 10. Such variability enhances the interactive experience of a user, for example, when engaging in a viewing or touch interaction of the screen 12.

In the illustrated example, the mobile device 10, oriented in landscape mode, includes a body 11 having a screen 12 (e.g., liquid crystal display/LCD, stereoscopic display, etc.) that is viewable by a user 14. The mobile device 10 may be, for example, a smart phone, mobile Internet device (MID), smart tablet, convertible tablet, notebook computer, or other similar portable device. The screen 12 may be a touch screen whereby text, data, indicia, etc. may be entered via one or more fingers, or a mechanical device such as a stylus.

Figure 3:
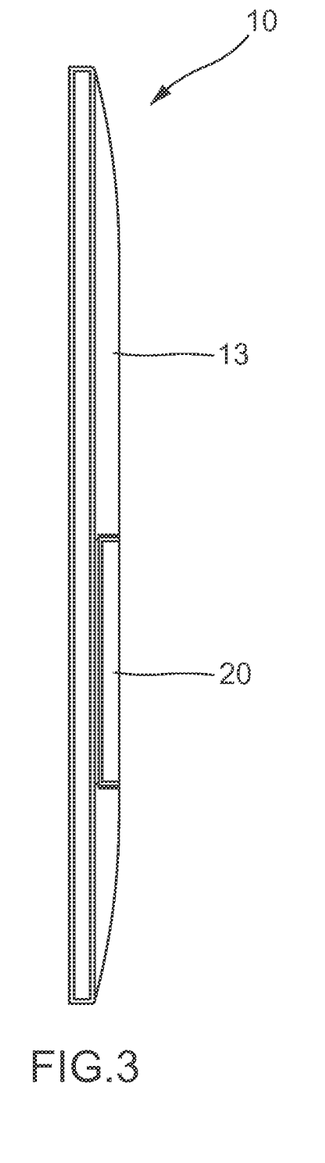
FIG. 3 is a side view of an example of a mobile computing device with an adjustable support in a non-deployed position, in accordance with embodiments.

As illustrated in FIG. 3, the support 20 may be detachably received into a back panel or plate 13 of the mobile device 10 such that, when in a retracted or non-deployed position, shares the structural form of the mobile device 10. For example, the support 20, when in the retracted position, is hidden in a seamless manner into the back plate 13 so as not to project from the outer surface of the back plate 13. Meaning, when the support 20 is in the non-deployed position, the outer surface thereof is co-planar to the outer surface of the back plate 13.

Figure 4:
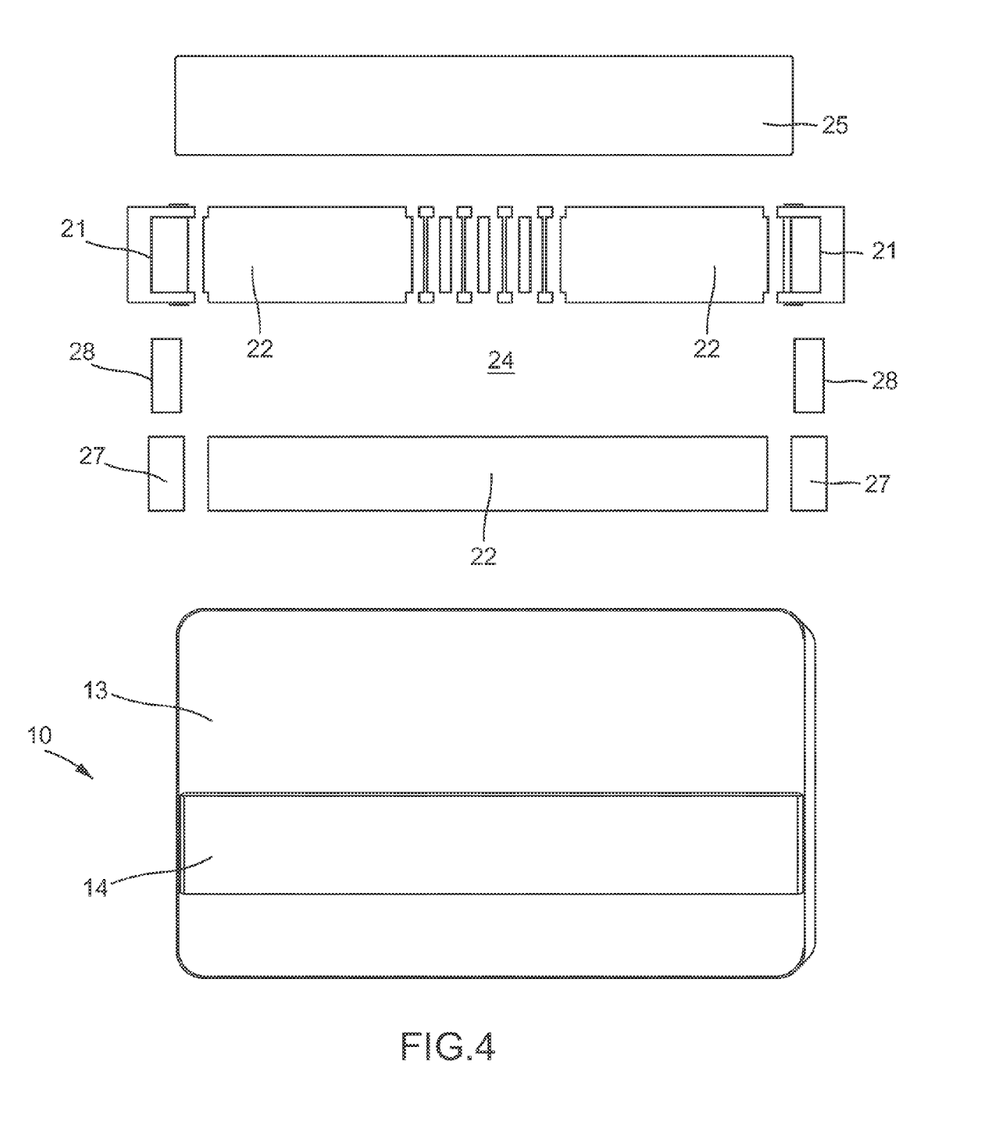
FIG. 4 is an exploded view of an example of a mobile computing device with an adjustable support, in accordance with embodiments.

As illustrated in FIG. 4, the back plate 13 of the mobile device 10 includes a recessed slot, track, well or guide 14 into which the adjustable support 20 is detachably mounted to facilitate linear, reciprocating movement therein. The guide 14 may be composed of a polymeric, metallic, and/or composite material, or combinations thereof, for example, when the support 20 is mechanically driven between the non-deployed and deployed positions. When the support 12 is magnetically driven, the guide 14 may be composed of a magnetically conductive material.

The guide 14 is spatially located on the back plate 13 in a manner that enables the mobile device 10 to be stably supported when operating in either a landscape mode or portrait mode. For example, when the mobile device 10 is oriented in a landscape mode, the well 14 extends along a horizontal axis between side edges of the body 11. The guide 14 is spatially oriented on the back plate 13 so as to be offset from the geometric center of the horizontal axis (when the mobile device 10 is in landscape mode) of the back plate 13. Meaning, the guide 14 is not symmetrically disposed about an axis that extends horizontally through the geometric center of the back plate 13.

When, on the other hand, the mobile device 10 is oriented in a portrait mode, the guide 14 extends along a vertical axis between the side edges of the body 11. The guide 14 is spatially oriented on the back plate 13 so as to be offset from the geometric center of the vertical axis of the back plate 13.

Meaning, the guide 14 is not symmetrically disposed about an axis that extends vertically through the geometric center of the back plate 13.

In accordance with embodiments, the adjustable support 20 may comprise a hinge that is received into the guide 14 for linear, reciprocating movement therein. Such a hinge may comprise, for example, a bi-pivotal hinge. Such a hinge may comprise, for example, a living hinge. The hinge may be composed of a material that affords flexibility when in use. The hinge may be composed of a rigid material that is flexible when in use, such as, for example, a carbon fiber material.

In accordance with embodiments, the adjustable support 20 comprising a hinge may be received into the well 14 of the back plate 13 to facilitate linear, reciprocating movement in a mechanical manner. For instance, the adjustable support 20 may be operatively connected to the well 14 via, for example, a rack-and-pinion arrangement that permits selective adjustment of the support 20 to between a plurality of different configurations. The structural architecture of the hinge may include a pair of hinge arms 22 operatively connected via an arrangement 24 of linkage bands and press pins. The arrangement 24 enables bending of the apex of the hinge when the support 20 is selectively manipulated into one of the plurality of deployed configurations.

At the outermost regions of the support 20 are adjustment members 21 comprising finger tabs that are operatively connected to the guide well 14 to facilitate linear, reciprocating movement along a guide axis so as to change the relative configuration of the support 20 relative to the back panel 13. The outer surface treatment of the adjustment members 21 is sloped, which aids in providing friction to the finger of a user (or to a mechanical device) when deploying the support 20.

When the support 20 is in a non-deployed position, the adjustment members 21 are spaced apart a maximum distance. This maximum spatial distance is reduced when one or both of the finger tabs are manipulated for movement inwardly along the guide axis.

The adjustment members are also operatively connected at a distal end of a corresponding hinge arm 22. Such a connection forms a hinge axis about which the hinge arm 22 pivots. The hinge axis is perpendicular to the guide axis of the adjustment member 21. Particularly, movement of an adjustment member 21 along the guide axis simultaneously causes the pivotal movement of the corresponding hinge arm 22 about the hinge axis.

Figure 5:
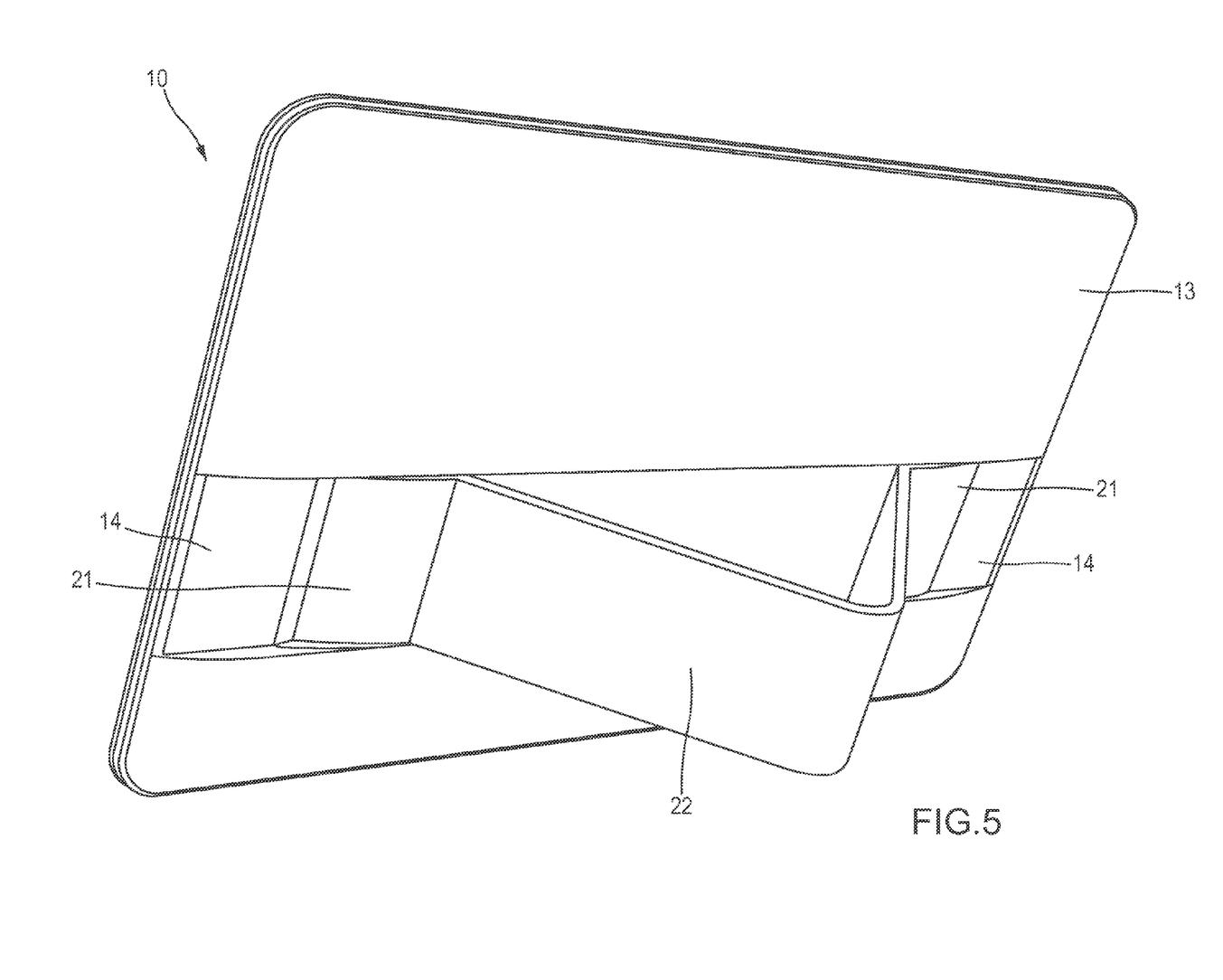
FIG. 5 is a rear, perspective view of an example of a mobile computing device supported by an adjustable support in landscape mode, in accordance with embodiments.

In accordance with embodiments, the adjustment members 21 may be moveable simultaneously with respect to each other, thus causing the hinge arms 22 to pivot in unison. As illustrated in FIG. 5, in this way, for example, selective manipulation of both adjustment members 21 along the guide axis enables the mobile device 10 to be supported when in a landscape mode.

Figure 6:
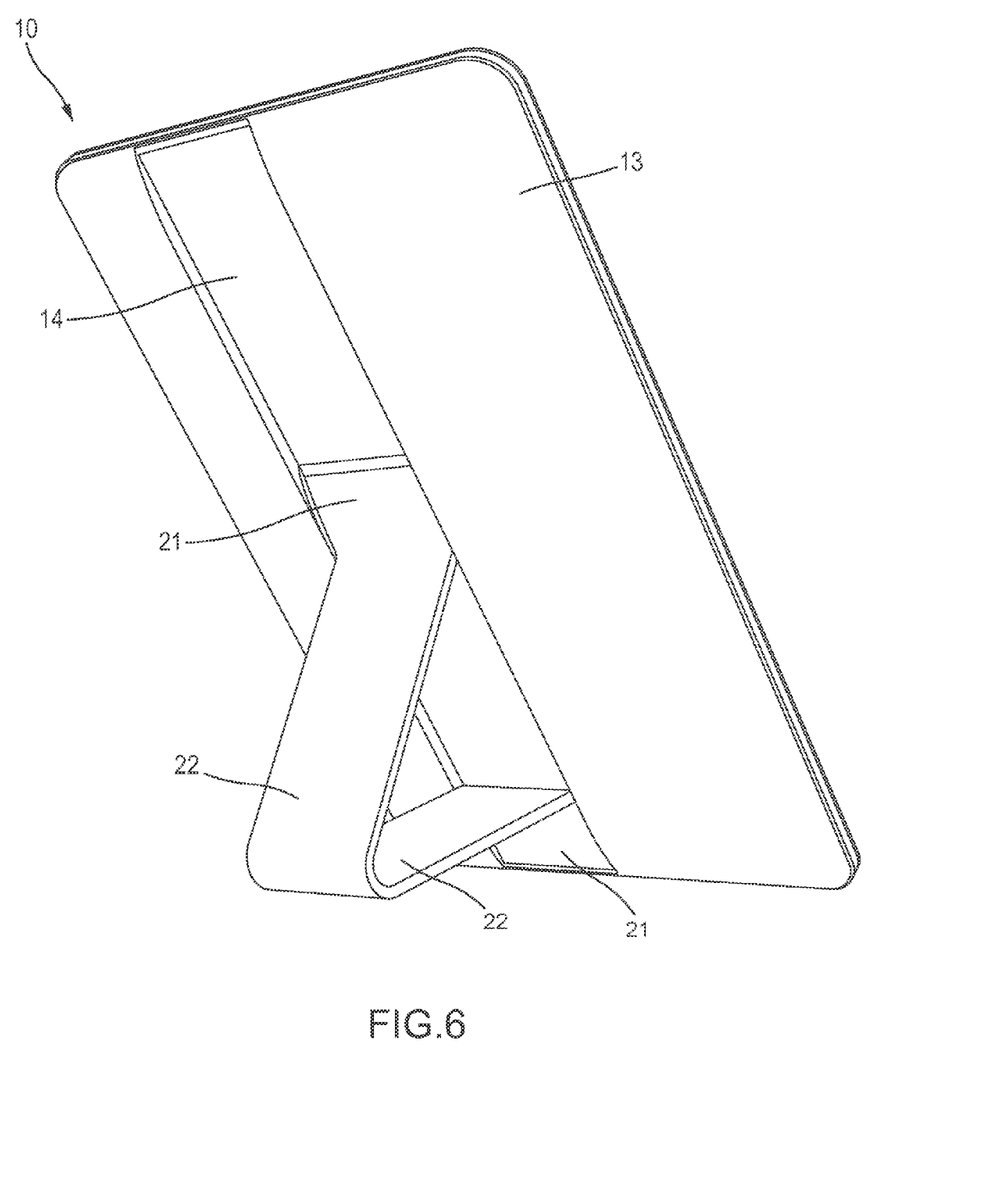
FIG. 6 is a rear, perspective view of an example of a mobile computing device supported by an adjustable support in portrait mode, in accordance with embodiments.

Alternatively or additionally, in accordance with embodiments, the adjustment members 21 may be moveable independently of each other. As illustrated in FIG. 6, in this way, for example, selective manipulation of one adjustment member 21 along the guide axis enables the mobile device 10 to be supported when in a landscape mode.

In accordance with embodiments, the adjustment members 21 may be driven by a drive mechanism to induce or otherwise enable linear, reciprocating movement along the guide axis. The drive mechanism may also restrict, halt or otherwise prevent such linear, reciprocating movement once a desired support orientation has been obtained or when the support 20 is in a non-deployed position.

In accordance with embodiments, the drive mechanism may comprise a mechanical drive. In such a drive arrangement, the adjustment members 21 may be operatively connected to the guide 14 via, for example, a rack-and-pinion arrangement that permits selective movement of the adjustment members 21 along the guide axis. Embodiments are, however, not limited to a rack-and-pinion drive, and may include any mechanical drive permitting linear, reciprocating movement of the adjustment members 21.

Alternatively or additionally, in accordance with embodiments, the adjustment members 21 may be driven magnetically to enable linear, reciprocating movement along the guide axis. In such an arrangement, the adjustment members 21 may include outer tabs that are received in a guide slot at a sidewall of the guide 14. A main magnetized body 26, which may comprise a permanent magnet, may be spatially positioned underneath the guide 14, which in such an embodiment is composed of a magnetically conductive material. A secondary magnetized body 27, which may comprise a permanent magnet, is operatively connected to a corresponding adjustment member 21 and magnetically communicates with the main magnetized body 21 via the guide 14.

In accordance with embodiments, the magnetic attraction between the main magnetized body 26 and the secondary magnetized body 27 prevents movement of the adjustment members 21 along the guide axis. In order to enable movement of the adjustment members 21, a sensor 28 which is operatively connected to a corresponding adjustment member 21 and also a corresponding secondary magnetized body 27, is provided. The sensor 28 is configured to facilitate the linear, reciprocating movement of the corresponding adjustment member 21 by reversing the polarity of the corresponding secondary magnetized body 27 when a user engages, i.e., submits a pressure against, the corresponding adjustment member 21. When a user disengages, the corresponding adjustment member 21, i.e., releases the pressure, the magnetic attraction between the main magnetized body 26 and the secondary magnetized body 27 is re-established to prevent movement of the adjustment member 21 to lock the support 20 into a desirable deployed position.

In order to prevent scratching of the support surface by the support 20 when in a retracted or deployed position, a protective sleeve 25 is provided on and/or over the support 20. The protective sleeve also serves to enhance the force required to enable a user to manipulate the adjustment members 21 along a linear, reciprocating path of the guide 14. The protective sleeve 25 may be composed of a silicone-based material, but embodiments are not limited with respect thereto.

Figure 7:
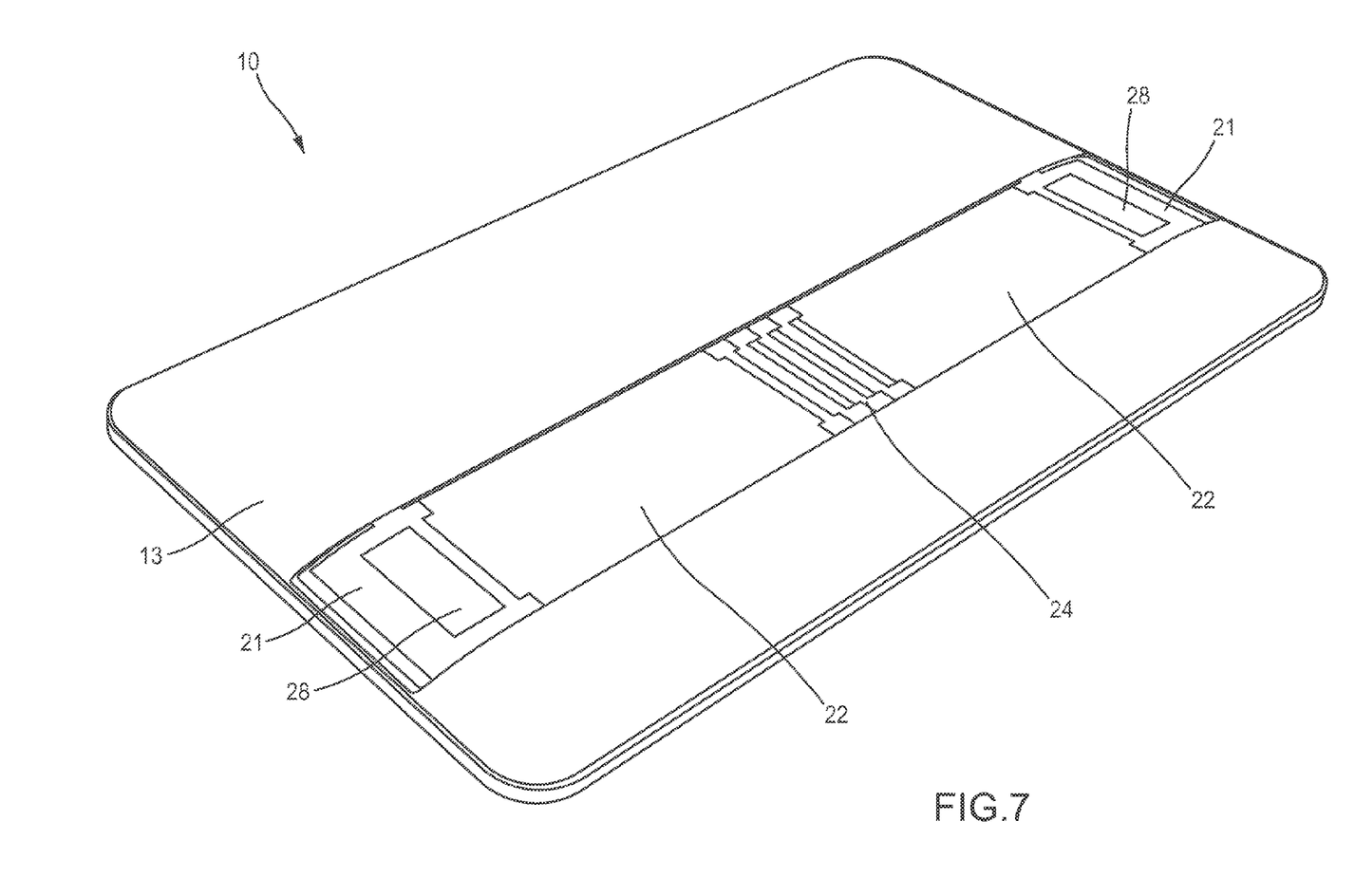
FIG. 7 is a top, perspective view of an example of a mobile computing device with an adjustable support in a non-deployed position, in accordance with embodiments.

As illustrated in FIGS. 6 and 7, the support 20 may be selectively manipulated, for example, manually by physical interaction of the user. The user may apply pressure to one or both adjustment members 21 by manipulating them inward along the guide axis. In order to increase the angle of support relative to the support surface, the user may continue to manipulate the adjustment members 21 inwardly towards each other to reduce the spatial distance between them. In order to decrease the angle of support relative to the support surface, the user may manipulate the adjustment members 21 outwardly away from each other to increase the spatial distance between them.

Alternatively and/or additionally, the support 20 may be selectively manipulated automatically in response to a wireless signal and/or in response to a program stored on a hard drive of the mobile device 10. Such variable configurations of the support 20 enable the mobile device 10 to be supported at a plurality of desirable orientations/angles relative to the support surface that are ergonomically beneficial to the user.

Selective manipulation of the support 20 to one of a plurality of configurations also stably supports the mobile device 10 against tipping over during a touch interaction by the user, e.g., when entering text, data, indicia, etc. using the touch screen 12. Such selective manipulation of the support 20 also enables a user to have comfort when the user is engaged in non-physical interaction of the screen 10, e.g., when viewing the screen 12.

Figure 8:
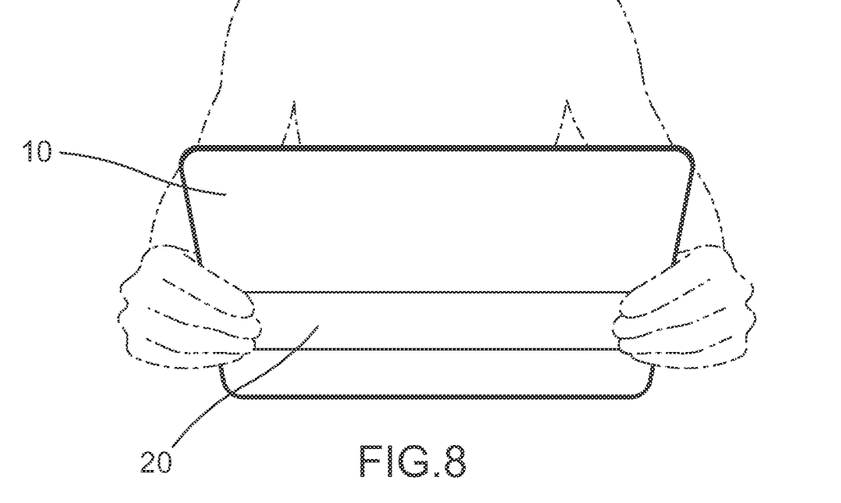
FIG. 8 is a perspective view of an example of a mobile computing device with an adjustable support held in a non-deployed position by a user, in accordance with embodiments.

In the illustrated examples of FIGS. 1, 2 and 8, the mobile device 10 may be supported by the support 20 at various angles with respect to a support surface while the screen 12 is in a landscape orientation and operating in home screen mode. The mobile device 10 may also be supported by the support 20 at various angles with respect to a support surface while the screen 12 is in a landscape orientation and operating in reverse home screen mode.

Figure 9:
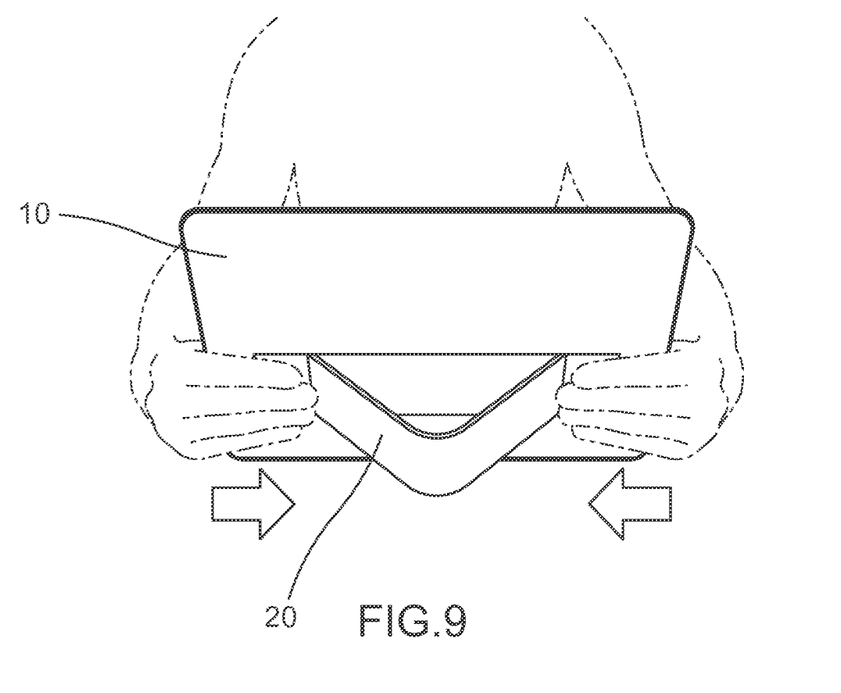
FIG. 9 is a perspective view of an example of a mobile computing device with an adjustable support manipulated by a user into a deployed position, in accordance with embodiments.

In the illustrated example of FIG. 9, the mobile device 10 may be supported by the support 20 at various angles with respect to a support surface while the screen 12 is in a portrait orientation.

As illustrated in FIGS. 8 and 9, to support the mobile device 10 in a landscape orientation, the support 20 may be deployed from the retracted position by selectively manipulating the adjustment members 21 inwardly towards each other along the guide axis such that the hinge arms 22 form an angle relative to the guide 14. In accordance with embodiments, the hinge arms 22 combine to form a triangle with the overlapped surface of the guide 14. The configuration of the triangle is modified as one or both of the adjustment members 21 traverses along the guide axis.

Additional Notes and Examples:

Example one may include a mobile device having a display, a back panel, a support positioned at the back panel, and adjustment members pivotally connected to respective outer ends of the support and mounted at the back panel to facilitate linear, reciprocating movement along an axis so as to change the relative orientation of the support relative to the back panel.

Example two may include an apparatus to stabilize a mobile device, having a support positioned at a back panel of the mobile device, and adjustment members connected to respective outer ends of the support and mounted at the back panel to facilitate linear, reciprocating movement along an axis so as to change the relative orientation of the support relative to the back panel.

Additionally, the support of examples one and two may include a bi-pivotal hinge having a pair of hinge arms connected to a corresponding adjustment member for pivotal movement about a hinge axis during the linear, reciprocating movement of the corresponding adjustment member. Moreover, the adjustment members may be configured for linear, reciprocating movement independently of each other. Furthermore, the adjustment members may be configured for linear, reciprocating movement simultaneously with respect to each other. Further still, a drive mechanism may be provided and configured to induce and restrict the linear, reciprocating movement of the adjustment members. Yet further, the drive mechanism may include a magnetic drive having a magnetized body operatively connected to a corresponding adjustment member and which is in magnetic communication with the back panel. Also, a sensor may be provided and configured to facilitate the linear, reciprocating movement of the corresponding adjustment member by reversing the polarity of the corresponding magnetized body when a user engages the corresponding adjustment member.

Example three may involve a method of stabilizing a mobile device in which a support is positioned at a back panel of the mobile device, and operatively connecting an adjustment member to respective outer ends of the support and mounting the adjustment member at the back panel to facilitate linear, reciprocating movement along an axis so as to change the relative orientation of the support relative to the back panel.

Additionally, the method of example three may further include positioning the support and the adjustment members in a well of the back panel. Moreover, the support may include a bi-pivotal hinge having a pair of hinge arms connected to a corresponding adjustment member to facilitate pivotal movement about a hinge axis during the linear, reciprocating movement of the corresponding adjustment member. Furthermore, the adjustment members may be configured for linear, reciprocating movement independently of each other. Further still, the adjustment members may be configured for linear, reciprocating movement simultaneously with respect to each other. Yet further, the method may include inducing and restricting the linear, reciprocating movement of the adjustment members. Further still, inducing and restricting the linear, reciprocating movement of the adjustment members includes magnetically inducing and restricting the linear, reciprocating movement of the adjustment members. Also, the method may include operatively connecting a magnetized body to a corresponding adjustment member and magnetically communicating the magnetized body with a second magnetized body provided at the back panel. Also, inducing the linear, reciprocating movement of the adjustment members may include reversing the polarity of the magnetized body when a user engages a corresponding adjustment member.

Example four may involve a mobile device having a display, a back panel, a support positioned at the back panel, and adjustment means pivotally connected to respective outer ends of the support and mounted at the back panel to facilitate linear, reciprocating movement along an axis so as to change the relative orientation of the support relative to the back panel.

Example five may involve an apparatus to stabilize a mobile device, having a support positioned at a back panel of the mobile device, and adjustment means connected to respective outer ends of the support and mounted at the back panel to facilitate linear, reciprocating movement along an axis so as to change the relative orientation of the support relative to the back panel.

Additionally, the support of examples one and two may include a bi-pivotal hinge having a pair of hinge arms connected to a corresponding adjustment means for pivotal movement about a hinge axis during the linear, reciprocating movement of the corresponding adjustment means. Moreover, the adjustment means may be configured for linear, reciprocating movement independently of each other. Furthermore, the adjustment means may be configured for linear, reciprocating movement simultaneously with respect to each other. Further still, drive means may be configured to induce and restrict the linear, reciprocating movement of the adjustment means. Yet further, the drive means may include a magnetic drive having a magnetized body operatively connected to a corresponding adjustment means and which is in magnetic communication with the back panel. Also sensing means may be configured to facilitate the linear, reciprocating movement of the corresponding adjustment means by reversing the polarity of the corresponding magnetized body when a user engages the corresponding adjustment means.

Example six may include a method of stabilizing a mobile device, including positioning a support at a back panel of the mobile device; and operatively connecting adjustment means to respective outer ends of the support and mounting the adjustment means at the back panel to facilitate linear, reciprocating movement along an axis so as to change the relative orientation of the support relative to the back panel.

Additionally, the method of example three may further include positioning the support comprises positioning the support and the adjustment means in a well of the back panel. Moreover, the support may include a bi-pivotal hinge having a pair of hinge arms connected to a corresponding adjustment means to facilitate pivotal movement about a hinge axis during the linear, reciprocating movement of the corresponding adjustment means. Furthermore, the adjustment means may be configured for linear, reciprocating movement independently of each other. Further still, the adjustment means may be configured for linear, reciprocating movement simultaneously with respect to each other. Yet further, the method may include inducing and restricting the linear, reciprocating movement of the adjustment means. Further still, inducing and restricting the linear, reciprocating movement of the adjustment means includes magnetically inducing and restricting the linear, reciprocating movement of the adjustment means. Also, the method may include operatively connecting a magnetized body to a corresponding adjustment means and magnetically communicating the magnetized body with a second magnetized body provided at the back panel. Also, inducing the linear, reciprocating movement of the adjustment means may include reversing the polarity of the magnetized body when a user engages a corresponding adjustment means.

Embodiments provide a support that stable supports a mobile device in a variety of orientations on a support surface. The support is selectively adjustable to a plurality of configurations that enable the variety of viewing/user orientations of the mobile device. Such variability enhances the interactive experience of a user, for example, when engaging in a viewing or touch interaction of a screen of the mobile device.

Embodiments are applicable for use with all types of mobile devices, such as, for example, a smart phone, mobile Internet device (MID), smart tablet, convertible tablet, notebook computer, or other similar portable device.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile device, comprising:
   touchscreen display;
   a back panel;
   a support positioned at the back panel;
   adjustment members pivotally connected to respective outer ends of the support and mounted at the back panel to facilitate linear, reciprocating movement along an axis so as to securely change any of a range of relative orientations of the support with respect to the back panel;
   a drive mechanism including a magnetic drive having a magnetized body operatively connected to a corresponding adjustment member and which is in magnetic communication with the back panel, wherein the drive mechanism is configured to induce and restrict the linear, reciprocating movement of the adjustment members; and
   a sensor configured to facilitate the linear, reciprocating movement of the corresponding adjustment member by reversing polarity of the corresponding magnetized body when a user engages the corresponding adjustment member and again reversing the polarity of the corresponding magnetized body when the user disengages the corresponding adjustment member so as to securely fix the relative orientation of the support with respect to the back panel.

2. The mobile device of claim 1, wherein the support comprises a bi-pivotal hinge having a pair of hinge arms connected to a corresponding adjustment member for pivotal movement about a hinge axis during the linear, reciprocating movement of the corresponding adjustment member, wherein a sum of lengths of the hinge arms is substantially the same across the range of relative orientations.

3. The mobile device of claim 1, wherein the adjustment members are configured for linear, reciprocating movement independently of each other.

4. The mobile device of claim 1, wherein the adjustment members are configured for linear, reciprocating movement simultaneously with respect to each other.

5. An apparatus, comprising:
   a support positioned at a back panel of a mobile device;
   adjustment members pivotally connected to respective outer ends of the support and mounted at the back panel to facilitate linear, reciprocating movement along an axis so as to securely change any of a range of relative orientations of the support with respect to the back panel;
   a drive mechanism including a magnetic drive having a magnetized body operatively connected to a corresponding adjustment member and which is in magnetic communication with the back panel, wherein the drive mechanism is configured to induce and restrict the linear, reciprocating movement of the adjustment members; and
   a sensor configured to facilitate the linear, reciprocating movement of the corresponding adjustment member by reversing polarity of the corresponding magnetized body when a user engages the corresponding adjustment member and again reversing the polarity of the corresponding magnetized body when the user disengages the corresponding adjustment member so as to securely fix the relative orientation of the support with respect to the back panel.

6. The apparatus of claim 5, wherein the support comprises a bi-pivotal hinge having a pair of hinge arms connected to a corresponding adjustment member for pivotal movement about a hinge axis during the linear, reciprocating movement of the corresponding adjustment member, wherein a sum of lengths of the hinge arms is substantially the same across the range of relative orientations.

7. The apparatus of claim 5, wherein the adjustment members are configured for linear, reciprocating movement independently of each other.

8. The apparatus of claim 5, wherein the adjustment members are configured for linear, reciprocating movement simultaneously with respect to each other.

9. A method, comprising:

positioning a support at a back panel of a mobile device;

operatively connecting an adjustment member to respective outer ends of the support and mounting the adjustment member at the back panel to facilitate linear, reciprocating movement along an axis so as to securely change any of a range of relative orientations of the support with respect to the back panel;

operatively connecting a magnetized body to a corresponding adjustment member and magnetically communicating the magnetized body with a second magnetized body provided at the back panel;

inducing and restricting the linear, reciprocating movement of the adjustment members, including magnetically inducing and restricting the linear, reciprocating movement of the adjustment members by reversing polarity of the magnetized body when a user engages a corresponding adjustment member and reversing the polarity of a corresponding magnetized body when the user disengages the corresponding adjustment member so as to securely fix the relative orientation of the support with respect to the back panel.

10. The method of claim 9, wherein positioning the support comprises positioning the support and the adjustment member in a well of the back panel.

11. The method of claim 9, wherein the support comprises a bi-pivotal hinge having a pair of hinge arms connected to a corresponding adjustment member to facilitate pivotal movement about a hinge axis during the linear, reciprocating movement of the corresponding adjustment member, wherein a sum of lengths of the hinge arms is substantially the same across the range of relative orientations.

12. The method of claim 9, wherein the adjustment members are configured for linear, reciprocating movement independently of each other.

13. The method of claim 9, wherein the adjustment member are configured for linear, reciprocating movement simultaneously with respect to each other.

\* \* \* \* \*